(12) United States Patent
Luo et al.

(10) Patent No.: US 12,101,798 B2
(45) Date of Patent: Sep. 24, 2024

(54) SIDELINK LOGICAL CHANNEL AND RESOURCE CONFIGURATIONS

(71) Applicant: ZTE Corporation, Guangdong (CN)

(72) Inventors: Wei Luo, Guangdong (CN); Lin Chen, Guangdong (CN); Mengzhen Wang, Guangdong (CN)

(73) Assignee: ZTE Corporation, Guangdong (CN)

( * ) Notice: Subject to any disclaimer, the term of this patent is extended or adjusted under 35 U.S.C. 154(b) by 585 days.

(21) Appl. No.: 17/245,228

(22) Filed: Apr. 30, 2021

(65) Prior Publication Data

US 2021/0258980 A1 Aug. 19, 2021

Related U.S. Application Data

(63) Continuation of application No. PCT/CN2018/113480, filed on Nov. 1, 2018.

(51) Int. Cl.
*H04W 72/12* (2023.01)
*H04W 28/02* (2009.01)
*H04W 72/0453* (2023.01)
*H04W 72/121* (2023.01)
*H04W 72/1263* (2023.01)
(Continued)

(52) U.S. Cl.
CPC ..... *H04W 72/543* (2023.01); *H04W 28/0268* (2013.01); *H04W 72/0453* (2013.01); *H04W 72/121* (2013.01); *H04W 72/1263* (2013.01); *H04W 72/23* (2023.01); *H04W 72/535* (2023.01); *H04W 80/02* (2013.01)

(58) Field of Classification Search
CPC ........... H04W 72/543; H04W 28/0268; H04W 72/0453; H04W 72/121; H04W 72/1263; H04W 72/23; H04W 72/535; H04W 80/02; H04W 88/04; H04W 76/14; H04W 92/18; H04W 72/569; Y02D 30/70
See application file for complete search history.

(56) References Cited

U.S. PATENT DOCUMENTS 10,973,045 B2 * 4/2021 Xiao ............ H04W 28/18
11,240,698 B2 * 2/2022 Chang .......... H04W 76/30
(Continued)

FOREIGN PATENT DOCUMENTS

CN 106162930 A 11/2016
CN 107079530 A 8/2017
(Continued)

OTHER PUBLICATIONS

Extended European Search Report mailed May 18, 2022 for European Patent Application No. 18929843.3 (9 pages).
(Continued)

*Primary Examiner* — Jay P Patel
(74) *Attorney, Agent, or Firm* — Perkins Coie LLP

(57) ABSTRACT

Method, apparatus and systems are described to allow a base station to configure a logical channel or resources for sidelink communications. In one example aspect, a method for wireless communication includes receiving, by a user equipment, a message from a communication node. The message includes information for configuring a logical channel for a sidelink transmission. The method also includes configuring, a Medium Access Control (MAC) entity with the logical channel according to the information.

20 Claims, 6 Drawing Sheets

(51) Int. Cl.
*H04W 72/23* (2023.01)
*H04W 72/50* (2023.01)
*H04W 72/543* (2023.01)
*H04W 80/02* (2009.01)

(56) References Cited

U.S. PATENT DOCUMENTS

| | | | | |
|---|---|---|---|---|
| 11,405,932 | B2* | 8/2022 | Cheng | H04L 5/0091 |
| 2017/0041902 | A1* | 2/2017 | Sheng | H04W 72/02 |
| 2017/0257876 | A1 | 9/2017 | Loehr et al. | |
| 2018/0049225 | A1* | 2/2018 | Lee | H04W 72/1263 |
| 2018/0098370 | A1* | 4/2018 | Bangolae | H04W 88/04 |
| 2018/0139734 | A1 | 5/2018 | Babaei et al. | |
| 2018/0255559 | A1 | 9/2018 | Lee et al. | |
| 2019/0053251 | A1 | 2/2019 | Loehr et al. | |
| 2019/0174522 | A1* | 6/2019 | Xiao | H04W 28/18 |
| 2020/0053743 | A1* | 2/2020 | Cheng | H04W 4/40 |
| 2020/0169912 | A1* | 5/2020 | Chang | H04W 28/0268 |
| 2021/0212104 | A1* | 7/2021 | Li | H04W 72/23 |
| 2021/0274545 | A1* | 9/2021 | Adjakple | H04W 28/0268 |
| 2021/0410129 | A1* | 12/2021 | Freda | H04W 72/543 |
| 2022/0007230 | A1 | 1/2022 | Chen et al. | |

FOREIGN PATENT DOCUMENTS

| | | | | |
|---|---|---|---|---|
| CN | 107347215 | A | | 11/2017 |
| CN | 108141847 | A * | 6/2018 | ............ H04W 72/02 |
| EP | 3051737 | A1 | | 8/2016 |
| EP | 3206452 | A1 | | 8/2017 |
| EP | 3397015 | A | | 10/2018 |
| JP | 2018186506 | A | | 11/2018 |
| JP | 2019508931 | A | | 3/2019 |
| WO | WO-2018030726 | A1 * | 2/2018 | ............ H04W 36/00 |
| WO | WO-2018170481 | A1 * | 9/2018 | ............ H04W 24/08 |
| WO | WO-2018228267 | A1 * | 12/2018 | ........ H04W 28/0268 |
| WO | WO-2020039487 | A1 * | 2/2020 | ............. H04W 4/46 |
| WO | WO-2020065896 | A1 * | 4/2020 | ............... H04L 5/14 |

OTHER PUBLICATIONS

International Search Report and Written Opinion in International Application No. PCT/CN2018/113480, mailed Jul. 23, 2019, 7 pages.
JPO, Office Action for Japanese Patent Application No. 2021-523614, mail date: Oct. 14, 2022. 4 pages with unofficial English translation.
3GPP TS 38.331 V15.3.0, "3rd Generation Partnership Project; Technical Specification Group Radio Access Network; NR; Radio Resource Control (RRC) protocol specification (Release 15)," Sep. 2018.
IPO, First Examination Report for Indian Patent Application No. 202147020846, mail date: Dec. 28, 2022. 6 pages.
EPO, Communication pursuant to Article 94(3) EPC for European Application No. 18929843.3, mailed on Mar. 6, 2023, 5 pages.
Huawei et al., "Correction on the logical channel selection in sidelink LCP," 3GPP TSG-RAN WG2 Meeting #103, R2-1811986, Gothenburg, Sweden, Aug. 20-24, 2018, 3 pages.
Huawei et al., "Running CR to TS 38.331 for 5G V2X with NR sidelink," 3GPP TSG RAN2 WG2 #107bis, Chongqing, China, R2-1912377, Oct. 14-18, 2019, 73 pages.
Zte et al., "Consideration on QoS management for NR V2X," 3GPP TSG RAN2 WG2 #104, Spokane, USA, R2-1816988, Nov. 12-16, 2018, 4 pages.
Zte et al., "Consideration on NR V2X mode 1 resource allocation," 3GPP TSG RAN WG2 #104, Spokane, USA, R2-1816980, Nov. 12-16, 2018, 4 pages.
JPO, Notice of Allowance for Japanese Application No. 2021-523614, mailed on Jan. 26, 2023, 4 pages.
EPO, Communication pursuant to Article 94(3) EPC for European Application No. 18929843.3, mailed on Oct. 5, 2023, 5 pages.

* cited by examiner

300

350

400

450

SIDELINK LOGICAL CHANNEL AND RESOURCE CONFIGURATIONS

CROSS-REFERENCE TO RELATED APPLICATIONS

This application is a continuation of International Patent Application No. PCT/CN2018/113480, filed on Nov. 1, 2018, the contents of which are incorporated herein by reference in their entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques to allow a base station to configure a logical channel or resources in sidelink communications.

In one example aspect, a wireless communication method is disclosed. The method includes receiving, by a user equipment, a message from a communication node. The message includes information for configuring a logical channel for a sidelink transmission. The method also includes configuring, a Medium Access Control (MAC) entity with the logical channel according to the information.

In another example aspect, a wireless communication method is disclosed. The method includes transmitting, by a communication node, a message to a user equipment. The message includes information for the user equipment to configure a logical channel for a sidelink transmission.

In another example aspect, a wireless communication method is disclosed. The method includes receiving, by a user equipment, a message from a communication node. The message includes information about a logical channel group, a Quality of Service (QOS) parameter, or a QoS Flow Identity (QFI) parameter. The method also includes performing, by the user equipment, a sidelink transmission based on the information.

In another example aspect, a wireless communication method is disclosed. The method includes transmitting, by a communication node, a message to a user equipment for performing a sidelink transmission. The message includes information about a logical channel group, a Quality of Service (QOS) parameter, or a QoS Flow Identity (QFI) parameter.

In another example aspect, a wireless communication method is disclosed. The method includes receiving, by a user equipment, a message from a communication node for configuring a sidelink transmission or an uplink transmission without a dynamic grant. The message includes information about a configured grant. The method includes performing, by the user equipment, the sidelink transmission or the uplink transmission based on the information. The information indicates at least a list of QoS parameters for the configured grant, one or more QoS Flow Identity (QFI) parameters for the configured grant, one or more logical channel groups or one or more logical channels associated with the configured grant, a preemption configuration for the configured grant, an indicator indicating whether sharing is allowed, an indicator indicating whether preemption is allowed, or an indicator indicating whether preemption is allowed.

In another example aspect, a wireless communication method is disclosed. The method includes transmitting, by a communication node, a message to a user equipment for configuring a sidelink transmission or an uplink transmission without a dynamic grant. The message includes information about a configured grant. The information indicates at least one or more QoS parameters for the configured grant, one or more QoS Flow Identity (QFI) parameters for the configured grant, one or more logical channel groups or one or more logical channels associated with the configured grant, a preemption configuration for the configured grant, an indicator indicating whether sharing is allowed, or an indicator indicating whether preemption is allowed.

In yet another example aspect, a wireless communication apparatus is disclosed. The apparatus includes a processor that is configured to implement an above-described method.

In yet another example aspect, a computer-program storage medium is disclosed. The computer-program storage medium includes code stored thereon. The code, when executed by a processor, causes the processor to implement a described method.

These, and other, aspects are described in the present document.

DETAILED DESCRIPTION

Section headings are used in the present document only to improve readability and do not limit scope of the disclosed embodiments and techniques in each section to only that section. Certain features are described using the example of 5G wireless protocol. However, applicability of the disclosed techniques is not limited to only 5G wireless systems.

A vehicle network refers to a network that performs wireless communication and information exchange between a vehicle and an object (a car, a pedestrian, a roadside equipment, and the Internet, etc.) according to a communication protocol and data interaction standards. Communication through the Internet of Vehicles enables vehicles to gain driving safety, improve traffic efficiency, and access convenience or entertainment information. The Internet of Vehicles communication includes three different types: Vehicle-to-Vehicle (V2V), communication between vehicles and roadside equipment/network infrastructure (Vehicle-To-Infrastructure/Vehicle-to-Network (V2I/V2N for short)), and Vehicle-to-Pedestrian (V2P). These types are collectively referred to as V2X communication.

Figure 1:
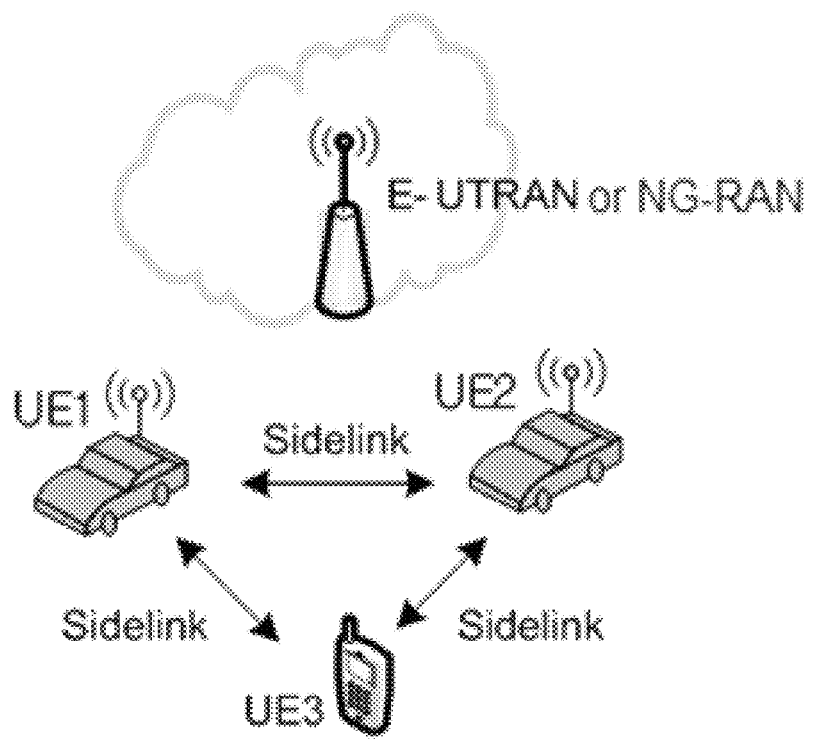
FIG. 1 shows an example of a sidelink communication between user devices.

In the Long Term Evolution (LTE) communication systems, V2X communication is performed based on the direct link between the User Equipment (UE). That is, the service data is not forwarded by the base station and the core network. Instead, data is directly transmitted by the source UE to the target UE through the air interface. FIG. 1 shows an example of a sidelink communication between user devices. The communication mechanism shown in FIG. 1 is referred to as PC5-based V2X communication or V2X sidelink communication.

With the advancement of technology and the development of the automation industry, the V2X communication scenario is further extended and has higher performance requirements. Advanced V2X services are divided into four main categories: vehicle platooning, extended sensors, automated driving (semi-automated or full-automated driving), and remote driving. Examples of performance requirements include: packet size ranges from 50 to 12000 bytes, transmission rate ranges from 2 to 50 messages per second, maximum end-to-end delay ranges from 3 to 500 milliseconds, reliability ranges from 90% to 99.999%, data rate ranges from 0.5 to 1000 Mbps, and the transmission range is between 50 to 1000 meters.

In V2X communication scenarios, UEs can send multiple V2X messages simultaneously, while each of the message can have different periodicity, arrival time, and/or message size. Currently, the UE configures the logical channel for sidelink transmissions. However, independent configuration of the sidelink transmissions may not be an optimal use of network resources when different V2X messages require different periodicity, arrival time, and/or message size. The present document discloses various techniques that can be used in implementations to allow the base station to provide information for configuring the sidelink transmissions, thereby allowing more efficient use of the network resources and reducing delay.

Figure 2A:
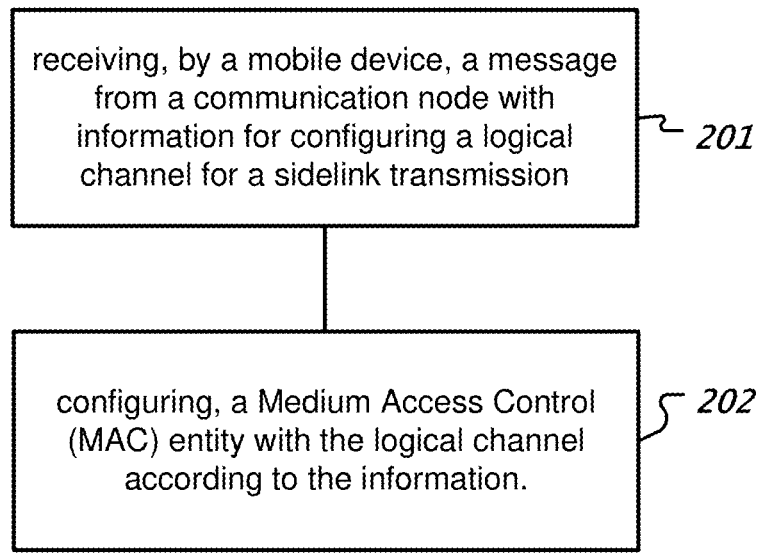
FIG. 2A is a flowchart representation of a method for wireless communication in accordance with one or more embodiments of the present technology.

FIG. 2A is a flowchart representation of a method 200 for wireless communication in accordance with one or more embodiments of the present technology. The method 200 includes, at step 201, receiving, by a user equipment, a message from a communication node. The message includes information for configuring a logical channel for a sidelink transmission. The method 200 includes, at step 202, configuring, a Medium Access Control (MAC) entity with the logical channel according to the information.

Figure 2B:
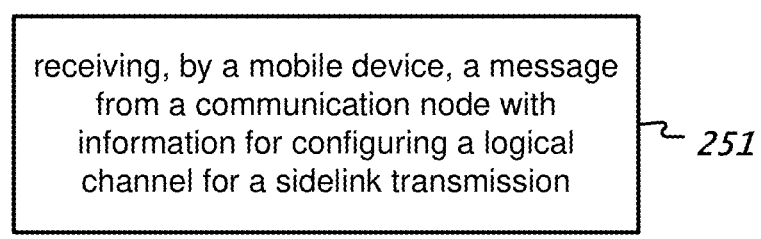
FIG. 2B is a flowchart representation of another method for wireless communication in accordance with one or more embodiments of the present technology.

FIG. 2B is a flowchart representation of a method 250 for wireless communication in accordance with one or more embodiments of the present technology. The method 3250 includes, at step 251, transmitting, by a communication node, a message to a user equipment. The message includes information for the user equipment to configure a Medium Access Control (MAC) entity with the logical channel according to the information.

Figure 3A:
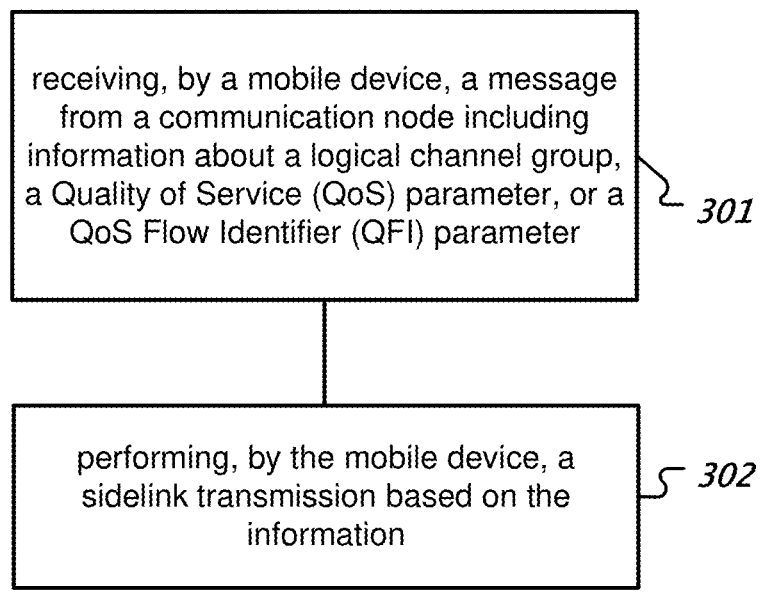
FIG. 3A is a flowchart representation of another method for wireless communication in accordance with one or more embodiments of the present technology.

FIG. 3A is a flowchart representation of a method 300 for wireless communication in accordance with one or more embodiments of the present technology. The method 300 includes, at step 301, receiving, by a user equipment, a message from a communication node. The message includes information about a logical channel group or a Quality of Service (QOS) parameter. The method 300 includes, at step 302, performing, by the user equipment, a sidelink transmission based on the information.

Figure 3B:
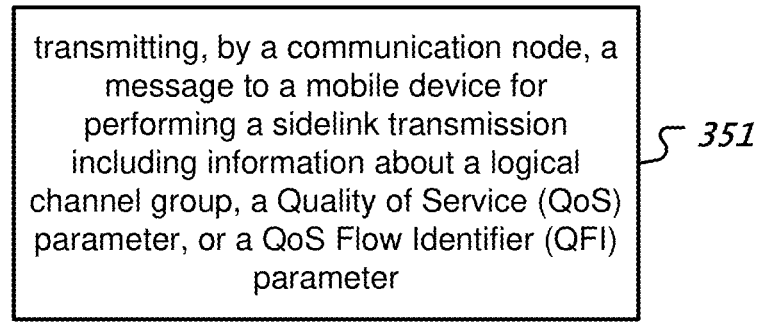
FIG. 3B is a flowchart representation of another method for wireless communication in accordance with one or more embodiments of the present technology.

FIG. 3B is a flowchart representation of a method 350 for wireless communication in accordance with one or more embodiments of the present technology. The method 350 includes, at step 351, transmitting, by a communication node, a message to a user equipment for performing a sidelink transmission. The message includes information about a logical channel group or a Quality of Service (QOS) parameter.

Figure 4A:
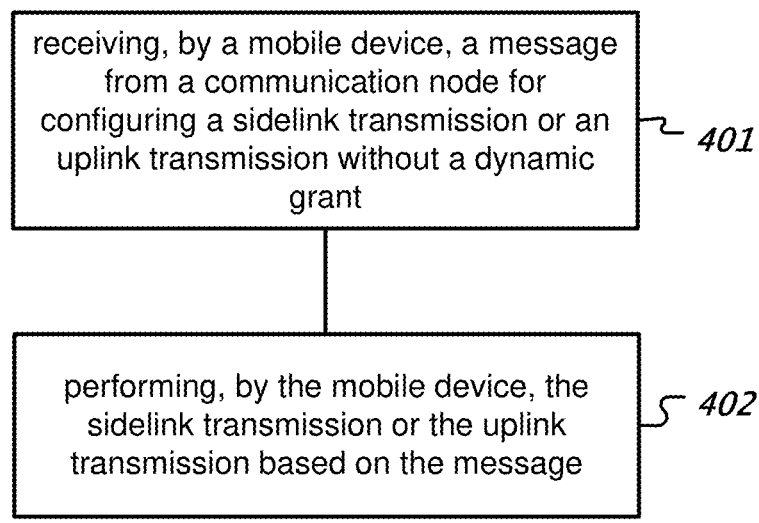
FIG. 4A is a flowchart representation of another method for wireless communication in accordance with one or more embodiments of the present technology.

FIG. 4A is a flowchart representation of a method 400 for wireless communication in accordance with one or more embodiments of the present technology. The method 400 includes, at step 401, receiving, by a user equipment, a message from a communication node for configuring a sidelink transmission or an uplink transmission without a dynamic grant. The message includes information about a configured grant. The method 400 includes, at step 402, performing, by the user equipment, the sidelink transmission or the uplink transmission based on the information. The information indicates at least a list of QoS parameters for the configured grant, one or more logical channel groups or one or more logical channels associated with the configured grant, or a preemption configuration for the configured grant, or an indicator indicating whether sharing is allowed.

Figure 4B:
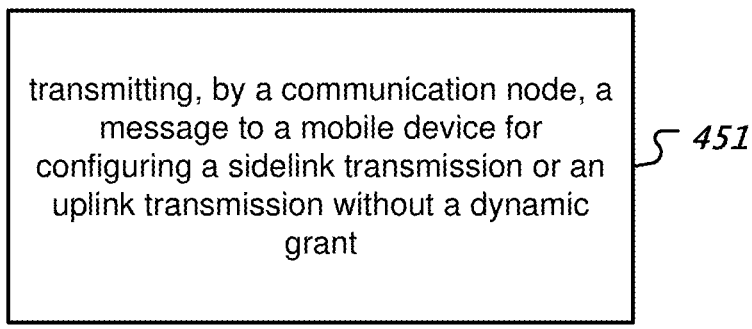
FIG. 4B is a flowchart representation of another method for wireless communication in accordance with one or more embodiments of the present technology.

FIG. 4B is a flowchart representation of a method 450 for wireless communication in accordance with one or more embodiments of the present technology. The method 450 includes, at step 451, transmitting, by a communication node, a message to a user equipment for configuring a sidelink transmission or an uplink transmission without a dynamic grant. The message includes information about a configured grant. The information indicates at least a list of QoS parameters for the configured grant, one or more logical channel groups or one or more logical channels associated with the configured grant, or a preemption configuration for the configured grant, or an indicator indicating whether sharing is allowed.

Some examples of the disclosed techniques are described in the following example embodiments.

Embodiment 1

This embodiment describes an example of configuring a logical channel of a sidelink transmission. In this embodiment, the base station transmits a message, such as a Radio Resource Control (RRC) message, for the UE to configure the sidelink logical channel parameters for sidelink transmissions.

In some embodiments, the base station includes an information element (IE), such as a SL-LogicalChannelConfig, in the RRC message to enable the UE to configure the sidelink logical channel parameters. The UE then configures or reconfigures the MAC entity with a logical channel in accordance to the received SL-LogicalChannelConfig.

An example SL-LogicalChannelConfig is shown below:

maximum and/or a minimum value for a QoS parameter), the one or more associated QFI parameters, the SR identity, the configured grant index list, or the transmission mode.

In some embodiments, the SL-LogicalChannelConfig may include one or more SR IDs associated to the logical channel. For example, if an SR ID is present, it indicates that the schedule request configuration is applicable to the associated logical channel. The MAC entity may be configured with zero, one, or more SR configurations. An SR configuration includes a set of PUCCH resources for SR across different Bandwidth Parts (BWPs) and cells. Each SR configuration associates to one or more logical channels. Similarly, each logical channel may be mapped to zero or one SR configuration, which can be configured by the RRC signaling. The SR configuration of the logical channel that triggered the Buffer State Report (BSR) is considered as the associated SR configuration for the triggered SR. In some embodiments, at most one PUCCH resource for SR is configured per BWP for a logical channel.

In some embodiments, the SL-LogicalChannelConfig may include an index or an index list of the configured grant(s) associated to the logical channel. It is noted that the configured grant includes configuredGrantType1 or configuredGrantType2. For example, the SL-LogicalChannelConfig may include at least one of the following fields to configure the grant:

```
LogicalChannelConfig:= SEQUENCE {
    SL-SpecificParameters SEQUENCE {
        priority INTEGER (1..N),
            SL-List := SEQUENCE {
        }
    schedulingRequestID SchedulingRequestId
        SL-5QIList ::=        SEQUENCE (SIZE (1..max5QI)) OF SL-5QI
SL-PPPRList ::=              SEQUENCE (SIZE (1..maxPPPR)) OF SL-PPPR
    SL-5QI ENUMERATED { B,C,D,1, 2, 3, 4, 5, 6, 7, 75, 79...spare1,spare2, spare3.. }
    SL-PPPR::= INTERGER (0..N)
    SL-PDB ::= INTERGER (0..N)
    configuredGrantTypeAllowed ENUMERATED {true} OPTIONAL,
    configuredGrantTypeAllowedlist ::= SEQUENCE (SIZE (1..maxConfiguredGrant-ConfigIndex))
        OF INTEGER (0..maxConfiguredGrant-ConfigIndex)
    }
}
```

In some embodiments, each sidelink logical channel has associated Quality of Service (QOS) information (e.g., a list or a range such as a maximum and/or a minimum value for a QoS parameter), one or more associated QoS Flow ID (QFI) parameters, a scheduling request (SR) identity, a configured grant index list, or a transmission mode. In some embodiments, multiple sidelink logical channels may have the same QoS list, the SR identity, or the configured grant index list. The SL-LogicalChannelConfig can indicate a mapping between the logical channel (which is identified by the Logical Channel Identity (LCID)) and the associated QoS information (e.g., a list or a threshold range such as a 1. configuredGrantAllowed. If this field is present, the sidelink MAC Service Data Units (SDUs) from the associated logical channel can be transmitted on a configured grant.

2. configuredGrantAllowedList. If this field is present, the sidelink MAC SDUs from the associated logical channel can be transmitted on all the indicated configured grant in the configuredGrantAllowedList. The MAC entity can allocate configuredGrant resources indicated in configuredGrantAllowedlist to the associated sidelink logical channel.

Example fields about configured grant(s) that can be included in the SL-LogicalChannelConfig are shown below:

```
configuredGrantTypeAllowedlist::= SEQUENCE (SIZE (1..maxConfiguredGrant-ConfigIndex)) OF
    configuredGrantTypeAllowed-v16
configuredGrantTypeAllowed-v16 ::= SEQUENCE {
  ConfiguredGrant-ConfigIndex   ConfiguredGrant-ConfigIndex,
  configuredGrantTypeAllowed    ENUMERATED { true }
}
```

Another example field about configured grant(s) that can be included in the SL-LogicalChannelConfig is shown below:

```
configuredGrantTypeAllowedlist ::= SEQUENCE (SIZE (1..maxConfiguredGrant-ConfigIndex))
  OF INTEGER (0..maxConfiguredGrant-ConfigIndex)
```

In some embodiments, the SL-LogicalChannelConfig includes a QoS parameter list for a logical channel, or a threshold range (e.g., a maximum and/or a minimum value) for a QoS parameter. The QoS parameter in the list includes at least one of the following: 5G QoS Identifier (5QI), ProSe Per-Packet Priority (PPPP), ProSe Per-Packet Reliability (PPPR), a resource type such as Guaranteed Bit Rate (GBR), delay critical GBR, or non-GBR, a priority level, a Packet Delay Budget (PDB), a Packet Error Rate, an averaging window, or a transmission range level.

In some embodiments, the SL-List field shown above can be one of the following:

```
SL-5QIList ::=         SEQUENCE (SIZE (1..max5QI)) OF SL-5QI
SL-PPPRList ::=        SEQUENCE (SIZE (1..maxPPPR)) OF SL-PPPR
SL-PDBList ::=         SEQUENCE (SIZE (1..maxPDB)) OF SL-PDB
SL-RangeLevelList ::=  SEQUENCE (SIZE (1..maxRangeLevel)) OF SL-RangeLevel
SL-5QIList ::=         SEQUENCE (SIZE (1..max5QI)) OF SL-5QI
SL-QoSInfoList ::=     SEQUENCE (SIZE (1..maxQoSInfoList)) OF SL-QoSInfo
SL-QoSList       ::=   SEQUENCE (SIZE (1...maxQoSList)) OF SL-QOS
```

Embodiment 2

This embodiment describes an example of performing a sidelink transmission based on information provided by the base station. In this embodiment, the base station transmits a message, such as an RRC message, to the UE. The message includes a logical channel group, a Quality of Service (QOS) parameter, or a QoS Flow Identity (QFI) parameter so that the UE can perform a sidelink transmission based on the information included in the message.

In some embodiments, the information about the logical channel group includes at least one of: associated QoS information, associated QFI information, one or more scheduling request identities, one or more configured grant resources, or one or more transmission modes.

In some embodiments, the information about the QoS parameter includes at least one of: associated QFI information, one or more scheduling request identities, one or more configured grant resources, or one or more transmission modes. The information can also include the identifier of the QoS parameter.

In some embodiments, information about the QFI parameter includes at least one of: associated QoS information, one or more scheduling request identities, one or more configured grant resources, or one or more transmission modes.

In some embodiments, each sidelink logical channel is allocated to a Logical Channel Group (LCG) depending on the associated QoS information. The mapping between an identifier for the LCG (e.g., LCG ID) and the QoS information is provided by information in the RRC message (e.g., a logical channel group related IE).

In some embodiments, the logical channel group (LCG) related IE indicates, for each logical channel group, a list or a range of associated QoS information. An example priority list is shown as follows:

```
LogicalChGroupInfoList ::=   SEQUENCE (SIZE (1..maxLCG)) OF SL-PriorityList
SL-PriorityList ::=          SEQUENCE (SIZE (1 .. maxSL-Prio)) OF SL-Priority
```

An example priority range is shown below:

```
LogicalChGroupInfoList ::=    SEQUENCE (SIZE (1..maxLCG)) OF SL-Priorityrange
SL-Priorityrange ::=    SEQUENCE {
maxSL-PriorityList
minSL-PriorityList minSL-PriorityList
}
```

In some embodiments, elements in the list or the range are arranged according to an ascending order of the LCG IDs. Some example lists are provided below. It is noted that associated ranges can be provided as alternatives in the LCG-related IE.

```
SL-LogicalChGroup5QIInfoList ::=    SEQUENCE (SIZE (1..maxLCG)) OF SL-5QIList
SL-5QIList ::=    SEQUENCE (SIZE (1..max5QI)) OF SL-5QI
SL-LogicalChGroupPPPRInfoList ::=    SEQUENCE (SIZE (1..maxLCG)) OF SL-PPPRList
SL-PPPRList ::=    SEQUENCE (SIZE (1..maxPPPR)) OF SL-PPPR
SL-LogicalChGroupRangeLevelInfoList ::=    SEQUENCE (SIZE (1..maxLCG)) OF SL-
    RangeLevelList
SL-RangeLevelList ::=    SEQUENCE (SIZE (1..maxRangeLevel)) OF SL-RangeLevel
SL-LogicalChGroupQoSInfoList ::=    SEQUENCE (SIZE (1..maxLCG)) OF SL-QoSList
SL-QoSList ::=    SEQUENCE (SIZE (1..max5QI)) OF SL-QOS
SL-PPPRList ::=    SEQUENCE (SIZE (1..maxPPPR)) OF SL-PPPR
SL-PDBList ::=    SEQUENCE (SIZE (1..maxPDB)) OF SL-PDB
SL-RangeLevelList ::=    SEQUENCE (SIZE (1..maxRangeLevel)) OF SL-RangeLevel
```

In some embodiments, the LCG-related IE indicates, for each logical channel group, one or more SR identifiers. The SR IDs are arranged according to an ascending order of the LCG IDs. For example, if the element LogicalChGroupSRInfoList is present, it indicates the scheduling request configuration applicable to each logical channel group. The MAC entity may be configured with zero, one, or more SR configurations. An SR configuration includes a set of PUCCH resources for SR across different BWPs and cells. Each SR configuration associates to one or more logical channel groups. Similarly, each logical channel group may be mapped to zero or one SR configuration, which can be configured by the RRC signaling. The SR configuration of the logical channel that triggered the Buffer State Report (BSR) is considered as the associated SR configuration for the triggered SR. In some embodiments, at most one PUCCH resource for SR is configured per BWP for a logical channel group.

```
LogicalChGroupSRInfoList ::=    SEQUENCE (SIZE (1..maxLCG)) OF SchedulingRequestId
```

In some embodiments, the LCG-related IE indicates, for each logical channel group, a list of allowed configuredGrantType resources. The resources are arranged according to an ascending order of the LCG IDs. For example, if the element LogicalChGroupCGInfoList is present, it indicates all the allowed configuredGrantType resource configurations applicable to each logical channel group.

```
LogicalChGroupCGInfoList ::=    SEQUENCE    (SIZE    (1..maxLCG))    OF
    configuredGrantTypeAllowedlist
configuredGrantTypeAllowedlist ::=    SEQUENCE (SIZE (1 .. maxConfiguredGrant-ConfigIndex))
    OF INTEGER (0..maxConfiguredGrant-ConfigIndex)
```

In some embodiments, the LCG-related IE indicates, for each logical channel group, at least one of the following: a

```
LogicalChGroupSRInfoList ::=    SEQUENCE (SIZE (1..maxLCG)) OF SchedulingRequestId
``` list or a range of associated QoS information, a list or a range of associated QFI information, one or more SR IDs, one or more configured grant resources, one or more transmission modes. In some embodiments, the LCG-related IE also includes the LCG ID.

Here, the transmission mode includes at least two modes: mode1 and mode2. Mode1 means that the base station schedules the transmission resources based on sidelink specific Buffer Status Report (BSR) from the UE. Mode2 means that the UE selects the transmission resources from a resource pool configured by the base station.

Embodiment 3

In some embodiments, before the UE receives the Sidelink logical channel configuration information, the UE sends a bearer setup request or logical channel setup request to the base station. In some embodiments, the bearer setup request or the logical channel setup request is carried in UEAssistanceInformation or an RRC message. The bearer setup requests or the logical channel setup request includes information about a QoS parameter list.

The UE then receives a message (e.g., an RRC message) from the base station. If SL-LogicalChannelConfig is included in the message, it is used by the UE to configure the sidelink logical channel parameters. The UE then configures or reconfigures the MAC entity with the logical channel according to the received SL-LogicalChannelConfig (as described in Embodiment 1).

Embodiment 4

In some embodiments, the UE reports, prior to receiving a message from the base station, a first set of configuration information for configuring the logical channel of the sidelink transmission. The UE then receives a second set of configuration information from the base station. The UE reconfigures the sidelink logical channel based on the second set of configuration information from the base station.

In some embodiments, the second set of configuration information indicates, for each logical channel group, associated QoS information or associated QFI information (either in a list form or in a range form).

In some embodiments, the second set of configuration information indicates, for each logical channel group, a list of SchedulingRequestId. The elements in list of SchedulingRequestId are arranged according to an ascending order of the LCG IDs. If the list of SchedulingRequestId is present, it indicates the scheduling request configuration applicable for each logical channel group. One example list is shown below:

In some embodiments, the second set of configuration information includes, for each logical channel group, a list of allowed configuredGrantType resources. The elements in the list are arranged according to an ascending order of the LCG IDs. If the list of configuredGrantType resources is present, it indicates all the allowed configuredGrantType resource configuration applicable to each logical channel group. An example list is shown below:

```
LogicalChGroupCGInfoList ::=    SEQUENCE    (SIZE    (1..maxLCG))    OF
    configuredGrantTypeAllowedlist
configuredGrantTypeAllowedlist ::=    SEQUENCE (SIZE (1 .. maxConfiguredGrant-ConfigIndex))
    OF INTEGER (0..maxConfiguredGrant-ConfigIndex)
```

In some embodiments, the second set of configuration information includes, for each logical channel group, a list of transmission mode. The elements in the list are arranged according to an ascending order of the LCG IDs. If the list of transmission mode is present, it indicates all the allowed transmission mode applicable to each logical channel group.

In some embodiments, the second set of configuration information indicates, for each logical channel, associated QoS information or associated QFI information (either in a list form or in a range form).

In some embodiments, the second set of configuration information indicates, for each logical channel, a list of SchedulingRequestId. The elements in list of SchedulingRequestId are arranged according to an ascending order of the LC IDs. If the list of SchedulingRequestId is present, it indicates the scheduling request configuration applicable for each logical channel.

In some embodiments, the second set of configuration information includes, for each logical channel, a list of allowed configuredGrantType resources. The elements in the list are arranged according to an ascending order of the LC IDs. If the list of configuredGrantType resources is present, it indicates all the allowed configuredGrantType resource configuration applicable to each logical channel.

In some embodiments, the second set of configuration information includes, for each logical channel, a list of transmission mode. The elements in the list are arranged according to an ascending order of the LC IDs. If the list of transmission mode is present, it indicates all the allowed transmission mode applicable to each logical channel.

Here, the transmission mode includes at least two modes: mode1 and mode2. Mode1 means that the base station schedules the transmission resources based on sidelink specific Buffer Status Report (BSR) from the UE. Mode2 means that the UE selects the transmission resources from a resource pool configured by the base station.

Embodiment 5

The UE can receive a message (e.g., an RRC message) that indicates the mapping between the priority/Qos parameter and the configuredGrantType. Alternatively, the message can indicate the mapping between the priority/Qos parameter and the SchedulingRequestId. In some embodiments, the message can indicate the mapping between the priority/Qos parameter and the transmission mode.

In some embodiments, the message includes, for each QoS identity, a list of associated configuredGrantType indices. The indices in the list are arranged according to an ascending or descending order of the QoS identities. The configuredGrant resource associated with the QoS identity can be selected for V2X sidelink communication.

In some embodiments, the QoS parameter include at least one of the following: 5G QoS Identifier (5QI), Prose Per-Packet Priority (PPPP), Prose Per-Packet Reliability (PPPR), a resource type such as Guaranteed Bit Rate (GBR), delay critical GBR, or non-GBR, a priority level, a Packet Delay Budget (PDB), Packet Error Rate, an averaging window, or a transmission range level.

In some embodiments, the message includes, for each QoS identity, a list of associated SchedulingRequestIds. The SR IDs in the list are arranged according to an ascending or descending order of the QoS identities.

In some embodiments, the message includes, for each SchedulingRequestId, a list of QoS identities. The QoS IDs in the list are arranged according to an ascending or descending order of the SchedulingRequest identity.

In some embodiments, the message includes, for each configuredGrantType index, a list of QoS identities. The QoS IDs are arranged according to an ascending or descending order of the configuredGrantType indices.

In some embodiments, a QoS parameter related IE can be defined to include at least one of the following: associated QoS information (e.g., in a list or a range form), associated QFI information (e.g., in a list or a range form), one or more SR IDs, one or more configured grant resources, one or more transmissions modes. The QoS parameter related IE can also include an identifier of the QoS parameter.

Embodiment 6

The UE can receive a message (e.g., an RRC message) that indicates the mapping between a QFI parameter and a configuredGrantType. Alternatively, the message can indicate the mapping between the QFI parameter and the SchedulingRequestId. In some embodiments, the message can indicate the mapping between the QFI parameter and the transmission mode.

In some embodiments, the message includes, for each QFI, a list of associated configuredGrantType indices. The indices in the list are arranged according to an ascending or descending order of the QFI. The configuredGrant resource associated with the QFI can be selected for V2X sidelink communication.

In some embodiments, the message includes, for each QFI, a list of associated SchedulingRequestIds. The SR IDs in the list are arranged according to an ascending or descending order of the QFI.

In some embodiments, the message includes, for each SchedulingRequestId, a list of QFI. The QFI in the list are arranged according to an ascending or descending order of the SchedulingRequest identity.

In some embodiments, the message includes, for each configuredGrantType index, a list of QFI. The QFIs are arranged according to an ascending or descending order of the configuredGrantType indices.

In some embodiments, a QFI parameter related IE can be defined to include at least one of the following: the list or the range of associated QoS information, one or more SchedulingRequest IDs, one or more configured grant resources, or one or more transmission mode.

Embodiment 7

In this embodiment, the UE receives a message (e.g., an RRC message) from the base station for configuring a sidelink transmission or an uplink transmission without a dynamic grant. For example, the IE ConfiguredGrantConfig can be used to carry information for the sidelink transmission or the uplink transmission without a dynamic grant. The actual configured sidelink grant or uplink grant may either be configured via RRC (type1) or provided via the PDCCH (addressed to Configured Scheduling (CS) Radio Network Temporary Identifier (CS-RNTI)) (type2).

The ConfiguredGrantConfig can indicate at least one of the following types of information:

1. An index indicator that indicates the index of one of multiple SL/UL ConfiguredGrant configurations. An example of the index indicator is shown below:

```
ConfiguredGrant-ConfigIndex ::=    INTEGER (1..maxConfiguredGrant)
```

2. QoS information. A list or a range of QoS parameters can be included in ConfiguredGrantcConfig. The QoS parameter in the list/range includes at least one of the following: 5G QoS Identifier (5QI), ProSe Per-Packet Priority (PPPP), ProSe Per-Packet Reliability (PPPR), a resource type such as Guaranteed Bit Rate (GBR), delay critical GBR, or non-GBR, a priority level, a Packet Delay Budget (PDB), a Packet Error Rate, an averaging window, or a transmission range level. For example, ConfiguredGrantConfig can include a list or a range of associated SL-priority. An example list and an example range are shown below:

```
SL-PriorityList-r13 ::=    SEQUENCE (SIZE (1..maxSL-Prio-r13)) OF SL-Priority-r13
SL-Priorityrange ::=       SEQUENCE {
maxSL-PriorityList   maxSL-PriorityList
minSL-PriorityList   minSL-PriorityList
}
```

Similarly, other types of lists/ranges can be included in the ConfiguredGrantConfig. Some additional example lists are shown below. It is noted that associated ranges can be included in the ConfiguredGrantConfig as alternatives.

```
SL-5QIList ::=              SEQUENCE (SIZE (1..max5QI)) OF SL-5QI
SL-PPPRList ::=             SEQUENCE (SIZE (1..maxPPPR)) OF SL-PPPR
SL-PDBList ::=              SEQUENCE (SIZE (1..maxPDB)) OF SL-PDB
SL-RangeLevelList ::=       SEQUENCE (SIZE (1..maxRangeLevel)) OF
SL-RangeLevel
SL-QFIList ::=              SEQUENCE (SIZE (1..maxQFI)) OF SL-QFI
SL-QoSInfoList ::= SEQUENCE (SIZE (1..maxQoSInfoList)) OF SL-QoSInfo
SL-QoSInfo ::=              SEQUENCE {
SL-5QIList ::=              SEQUENCE (SIZE (1..max5QI)) OF SL-5QI
OR
SL-PPPRList ::=             SEQUENCE (SIZE (1..maxPPPR)) OF SL-PPPR
OR
SL-PDBList ::=              SEQUENCE (SIZE (1..maxPDB)) OF SL-PDB
OR
SL-RangeLevelList ::=       SEQUENCE (SIZE (1..maxRangeLevel)) OF SL-RangeLevel
}
```

3. All the allowed sidelink or uplink logical channel group or logical channel from which MAC SDUs can be transmitted on the configured grant. Example fields as shown as:

```
LogicalChGroupInfoList ::=      SEQUENCE (SIZE (1..maxLCG)) OF LogicalChGroup
LogicalChInfoList ::=           SEQUENCE (SIZE (1..maxLCID)) OF LogicalCh
```

The MAC entity can allocate configuredGrant resources to the associated sidelink logical channels listed in LogicalChInfoList or sidelink logical channel group listed in LogicalChGroupInfoList.

4. Whether preemption is allowed. If this field is present, it indicates that the resource can be preempted.

```
PreemptionAllowed    ENUMERATED { true }
```

5. Whether the resource can be shared with other UEs. If this field is present, it indicates that other UEs are allocated the same resource.

```
sharingAllowed    ENUMERATED { true }
```

6. Preemption configuration information.

Method 1: The information can include the preemption ID of the configure grant resource and the preempted resource indication. In some embodiments, the information simply indicates that the resource is being preempted.

One example of preemption configuration information is shown below:

```
ConfiguredgrantPreemption ::=    SEQUENCE {
int-RNTI                         RNTI-Value,
timeDomainOffset                 INTEGER (0..N),
timeDomainAllocation             INTEGER (0..N),
frequencyDomainAllocation        BIT STRING (SIZE(N)),
...
}
```

Here, frequencyDomainAllocation indicates the frequency domain resource allocation. timeDomainAllocation indicates a combination of start symbol, the length of the allocated resources, and a Physical Uplink Shared Channel (PUSCH) mapping type. timeDomainOffset is the offset related to subframe number (SFN)=0. Int-RNTI is the RNTI used for indicating preemption in the UL or SL transmissions.

Method 2: The information can indicate resources that cannot be preempted and resources that can be preempted separately. Another example of preemption configuration information is shown below:

```
rrc-ConfiguredUplinkGrant    SEQUENCE {
    timeDomainOffset                 INTEGER (0..5119),
    timeDomainAllocation             INTEGER (0..15),
    frequencyDomainAllocation        BIT STRING (SIZE(18)),
    antennaPort                      INTEGER (0..31),
    dmrs-SeqInitialization           INTEGER (0..1)                       OPTIONAL, -- Need R
    precodingAndNumberOfLayers       INTEGER (0..63),
    srs-ResourceIndicator            INTEGER (0..15)                      OPTIONAL, -- Need R
    mcsAndTBS                        INTEGER (0..31),
    frequencyHoppingOffset           INTEGER (1..maxNrofPhysicalResourceBlocks-1)   OPTIONAL,
    -- Need R
    pathlossReferenceIndex           INTEGER (0..maxNrofPUSCH-PathlossReferenceRSs-1),
}
ConfiguredgrantPreemption ::=    SEQUENCE {
    int-RNTI                         RNTI-Value,
    timeDomainOffset                 INTEGER (0..N),
    timeDomainAllocation             INTEGER (0..N),
    frequencyDomainAllocation        BIT STRING (SIZE(N)),
    ...
}
```

Method 1 and Method 2 can be applied to configured grant type 1.

In some embodiments, if the UE is provided higher layer parameter to indicate Semi-Persistent Scheduling (SPS) Preemption or configuredGrant Preemption, the UE is configured with a temporary identifier (e.g., SPS-INT-RNTI or CG-INT-RNTI) provided by higher layer parameter for monitoring PDCCH conveying the DCI message (e.g., in DCI format X).

If a UE detects a DCI format X from the configured set of serving cells, the UE may assume that transmission is invalid in frequency domain and time domain that are indicated by the RRC message, from a set of Physical Resource Blocks (PRBs) and/or a set of symbols of the last SPS or configuredGrant period.

Alternatively, if a UE detects a DCI format X with a preemption activation indication, the UE may assume that the frequency domain and time domain resource within allocated SPS or configuredGrant resource indicated by the RRC message cannot be used.

If a UE detects a DCI format x with a preemption release indication, the UE may assume that the SPS or configuredGrant resource indicated by the RRC message can be used again.

Method 3: The information indicates the periodicity for SL or UL transmission without SL or UL grant for type 1 and type 2. Alternatively, the information indicates the configured value of the initial value of the configured grant timer, in number of periodicities after the preemption occurs. Method 3 can be applied to both configured grant type 1 and configured grant type 2.

If a UE detects a DCI format X with a preemption activation indication, the UE may adopt the periodicity or configuredGrant timer indicated by the RRC message for preemption.

If a UE detects a DCI format x with a preemption release indication, the UE may assume that the SPS or configuredGrant resource indicated by the RRC message can be used again.

7. QFI information. A list or a range of QFI parameters can be included in ConfiguredGrantcConfig.

In some embodiments, when the UE does not use the UL configured grant type 1 or the SL configured grant type 1 resource(s), the UE may report such in the resource request information, the UE assistance information, or the sidelink UE information to the base station. Alternatively, the UE can send, e.g., via an MAC Control Element (CE), information for indicating a release of the type 1 resource, or a request to release the type1 resource.

In some embodiments, if multiple configured grant processes are supported, example confirmation mechanisms for multiple SPS processes or multiple configured grant processes are provided as follows:

1. Configure a configured grant confirmation MAC CE that has X bits. Each bit indicates a confirmation for the associated configured grant (e.g., value 1 indicates confirmed while value 0 indicates not confirmed). The value of X is consistent with the maximum number of configured grants; or
2. Report the configured grant or SPS index in the MAC CE to indicate which SPS index or configured grant type 2 is confirmed; or
3. Define multiple LCIDs (e.g., eight LCIDs) for SPS confirmation and configure the mapping relationship between SPS index and LCID. The SPS confirmation is indicated by the associated LCID. It is noted that only MAC subheader needs to be identified by LCID.

Embodiment 9

In some embodiments, when a UE is provided a parameter sidelinkPreemption by the higher layer, the UE is configured with a sidelink RNTI (e.g., SL-int-RNTI) for monitoring the Physical Downlink Control Channel (PDCCH). For example, the UE can monitor the PDCCH for a particular DCI format (e.g., DCI format X).

If the UE detects a DCI format X from a serving cell in the configured set of serving cells, the UE may assume that transmission is invalid. The Physical Resource Blocks (PRBs) and symbols for the invalid transmission can be indicated by the DCI message.

```
sidelinkPreemption ::=        SEQUENCE {
    SL-int-RNTI               RNTI-Value,
    int-ConfigurationPerServingCell    SEQUENCE (SIZE (1..maxNrofServingCells)) OF INT-
        ConfigurationPerServingCell,
    ...
}
INT-ConfigurationPerServingCell ::= SEQUENCE {
    servingCellId     ServCellIndex,
}
```

Embodiment 8

Before receiving the sidelink resource allocation information, the UE sends the resource request information, the UE assistance information, or the Sidelink UE information to the base station. The information includes at least one of the following: the MAC Protocol Data Unit (PDU) size, the associated SL logical channel, the uplink (UL) logical channel, the priority, the 5QI, the QFI, the reliability, the delay, the desired configured grant type (type 1 and/or type 2), the transmission frequency, the BWP, the subcarrier spacing, or whether shared resources can be configured. The base station can take the information into consideration when allocating resources for the UE.

Embodiment 10

Currently, when the Uu uplink transmission overlaps with the V2X sidelink transmission in the time domain and is at the same frequency, if the PPPP value of the sidelink MAC PDU is lower than the (pre)configured PPPP threshold, the sidelink transmission priority is higher than the Uu uplink transmission. When the Uu uplink transmission overlaps with the V2X sidelink transmission in the time domain but at different frequency points, if the PPPP value of the sidelink MAC PDU is lower than the (pre)configured PPPP threshold, the sidelink transmission priority is higher than the Uu uplink transmission, or the UE decreases Uu. Uplink transmission power. However, when the upper layer configuration Uu uplink transmission priority is higher or the random-access procedure is performed, the Uu uplink transmission priority is higher than the V2X sidelink transmission (regardless of the PPPP value of the sidelink MAC PDU).

In NR systems, if PC5 uses a 5QI-based QoS scheme, determining the priority of SL transmission and UL transmission can be a direct comparison. For example, when the Uu uplink transmission overlaps with the V2X sidelink transmission in the time domain, the transmission (either SL or UL) with higher 5QI priority has the higher priority. If SL 5QI is different from Uu 5QI (e.g., Uu, SL use different two sets of 5QI values), a threshold (e.g., SL 5QI) can be preconfigured and used to determine priority.

Embodiment 11

When the base station configures two transmission modes for the UE, the base station can further indicate which transmission mode is to be used for transmitting certain data packets.

For example, two transmission modes—mode1 and mode2—are configured by the base station. Mode1 means that the base station schedules the transmission resources based on sidelink specific BSR from the UE. Mode2 means that the UE selects the transmission resources from a resource pool configured by the base station.

When configuring the logical channel of the sidelink transmission, the base station can further indicate the transmission mode to be used for the sidelink transmission. Two example configuration methods are provided below:

Method 1: The base station includes a mode in an IE (e.g., SL-LogicalChannelConfig) to directly indicate the transmission mode (mode1 and/or mode2) to be used for the sidelink transmission. When the UE report the buffer status, the UE only includes the buffer status of the logical channel(s) configured with the mode1. For example, UE report Sidelink BSR containing buffer status for LCGs having data available. For example, for buffer status of each LCG, it only includes the buffer status of the logical channel(s) that configured for the mode of network schedules the transmission resources. For example, the MAC entity determines the amount of SL data available for a logical channel according to the data volume calculation procedure. The logical channel is configured for the mode of network schedules the transmission resources. Then the UE reports a buffer status about SL data volume in the MAC entity.

Method 2: The base station indicates a mapping between the transmission mode and the logical channel group. When the UE report the buffer status, the UE reports buffer status for all LCGs that are configured with mode1. and having data available. For example, UE report Sidelink BSR containing buffer status for all LCGs that configured for the transmission mode of network schedules the transmission resources and having data available. For example, the MAC entity determines the amount of SL data available for a logical channel according to the data volume calculation procedure. The logical channel belongs to a LCG that is configured for the mode of network schedules the transmission resources. Then the UE reports a buffer status about SL data volume in the MAC entity.

Method 3: The base station indicates a mapping between the transmission mode and the QoS parameters. When the UE report the buffer status, the buffer status only including the data packets of which the QoS parameters are configured with mode1. For example, UE report Sidelink BSR containing buffer status for all LCGs having data available, where the data only include the data packets of which the QoS parameters are configured with mode1. For example, the MAC entity determines the amount of SL data available for a logical channel according to the data volume calculation procedure. The SL data only include the data packets of which the QoS parameters are configured for the mode of network schedules the transmission resources. Then the UE reports a buffer status about SL data volume in the MAC entity.

Method 4: The base station indicates a mapping between the transmission mode and the QFI parameters. When the UE report the buffer status, the buffer status only including the data packets of which the QFI are configured with mode1. For example, UE report Sidelink BSR containing buffer status for all LCGs having data available, wherein the data only include the data packets of which the QFI are configured with the mode1. For example, the MAC entity determines the amount of SL data available for a logical channel according to the data volume calculation procedure. The SL data only include the data packets of which the QFI parameters are configured for the mode of network schedules the transmission resources. Then the UE reports a buffer status about SL data volume in the MAC entity.

Figure 5:
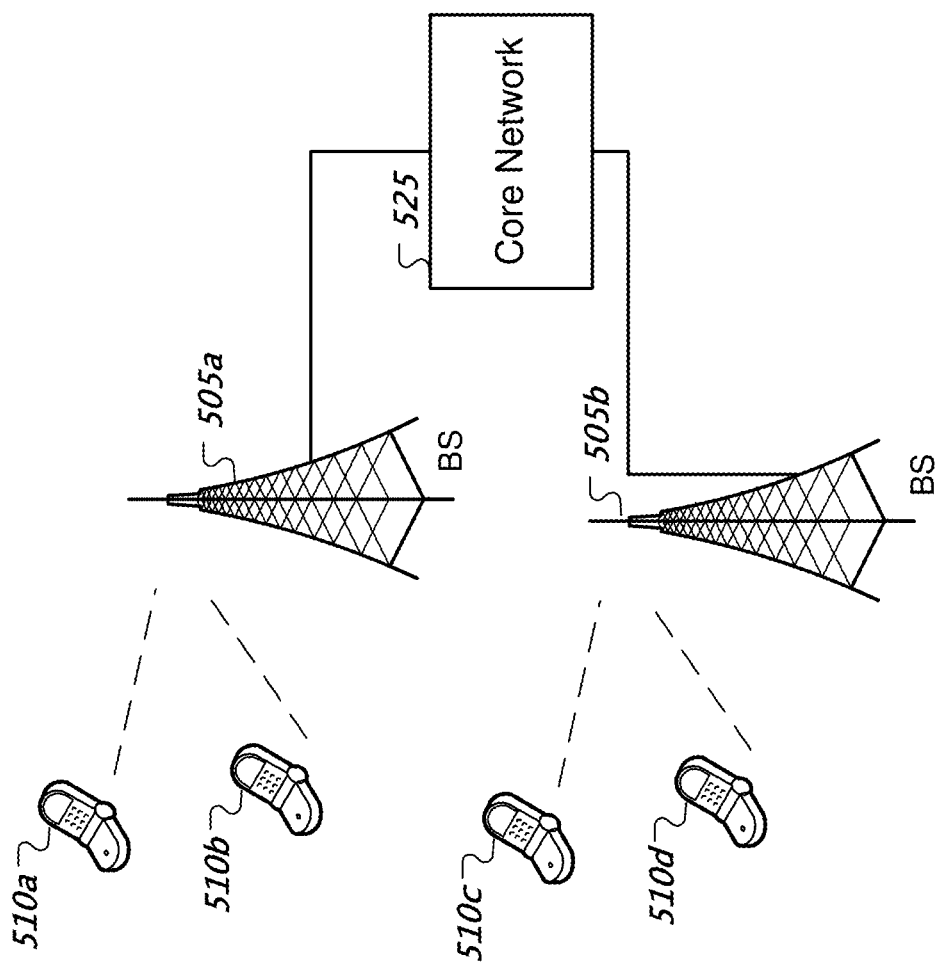
FIG. 5 shows an example of a wireless communication system where techniques in accordance with one or more embodiments of the present technology can be applied.

FIG. 5 shows an example of a wireless communication system 500 where techniques in accordance with one or more embodiments of the present technology can be applied. A wireless communication system 500 can include one or more base stations (BSs) 505a, 505b, one or more wireless devices 510a, 510b, 510c, 510d, and a core network 525. A base station 505a, 505b can provide wireless service to wireless devices 510a, 510b, 510c and 510d in one or more wireless sectors. In some implementations, a base station 505a, 505b includes directional antennas to produce two or more directional beams to provide wireless coverage in different sectors.

The core network 525 can communicate with one or more base stations 505a, 505b. The core network 525 provides connectivity with other wireless communication systems and wired communication systems. The core network may include one or more service subscription databases to store information related to the subscribed wireless devices 510a, 510b, 510c, and 510d. A first base station 505a can provide wireless service based on a first radio access technology, whereas a second base station 505b can provide wireless service based on a second radio access technology. The base stations 505a and 505b may be co-located or may be separately installed in the field according to the deployment scenario. The wireless devices 510a, 510b, 510c, and 510d can support multiple different radio access technologies.

Figure 6:
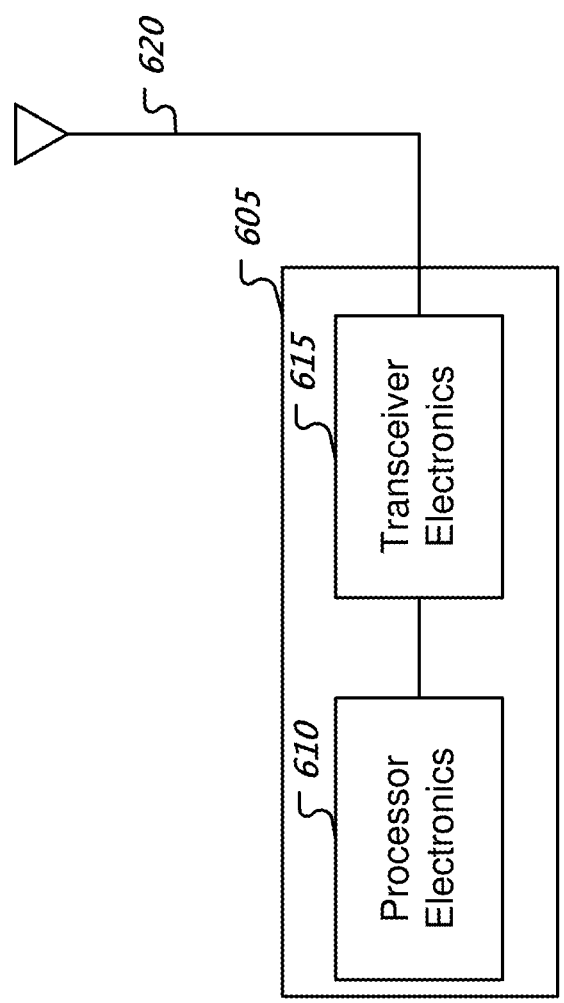
FIG. 6 is a block diagram representation of a portion of a radio station in accordance with one or more embodiments of the present technology can be applied.

FIG. 6 is a block diagram representation of a portion of a radio station. A radio station 605 such as a base station or a wireless device (or UE) can include processor electronics 610 such as a microprocessor that implements one or more of the wireless techniques presented in this document. The radio station 605 can include transceiver electronics 615 to send and/or receive wireless signals over one or more communication interfaces such as antenna 620. The radio station 605 can include other communication interfaces for transmitting and receiving data. Radio station 605 can include one or more memories (not explicitly shown) configured to store information such as data and/or instructions. In some implementations, the processor electronics 610 can include at least a portion of the transceiver electronics 615. In some embodiments, at least some of the disclosed techniques, modules or functions are implemented using the radio station 605.

It will be appreciated that the present document discloses techniques that can be embodied into wireless communication systems to allow the base station to configure the logical channel or resources used in a sidelink transmissions, thereby allowing more efficient use of the network resources and reducing delay.

In one example aspect, a method for wireless communication includes receiving, by a user equipment, a message from a communication node. The message includes information for configuring a logical channel for a sidelink transmission. The method also includes configuring, a Medium Access Control (MAC) entity with the logical channel according to the information.

In some embodiments, the information includes a list of scheduling request identities associated to the logical channel. In some embodiments, the information indicates one or more configured grant resources associated to the logical channel. In some embodiments, the information includes one or more Quality of Service (QOS) parameters for the logical channel, or one or more QoS Flow Identity (QFI) parameters for the logical channel. The one or more QoS parameters includes at least one of a 5G QoS Identifier (5QI), a ProSe Per-Packet Priority (PPPP), a ProSe Per-Packet Reliability (PPPR), a resource type, a priority level, a Packet Delay Budget (PDB), a Packet Error Rate, an averaging window, or a transmission range level. In some embodiments, the information indicates a transmission mode to be used for the sidelink transmission.

In some embodiments, the method includes transmitting, prior to receiving the message, a request to the communication node for configuring the logical channel or a sidelink bearer associated with the sidelink transmission.

In some embodiments, the method includes transmitting, by the user equipment, a second message to the communication node prior to receiving the message. The second message including a second set of information for configuring the logical channel for the sidelink transmission.

In another example aspect, a method for wireless communication includes transmitting, by a communication node, a message to a user equipment. The message includes information for the user equipment to configure a logical channel for a sidelink transmission.

In some embodiments, the information includes a list of scheduling request identities associated to the logical channel. In some embodiments, the information indicates one or more configured grant resources associated to the logical channel. In some embodiments, the information includes one or more Quality of Service (QOS) parameters associated to the logical channel, or one or more QoS Flow ID (QFI) parameters associated to the logical channel. The one or more QoS parameters includes at least one of a 5G QoS Identifier (5QI), a ProSe Per-Packet Priority (PPPP), a ProSe Per-Packet Reliability (PPPR), a resource type, a priority level, a Packet Delay Budget (PDB), a Packet Error Rate, an averaging window, or a transmission range level. In some embodiments, the information indicates a transmission mode to be used for the sidelink transmission.

In some embodiments, the method includes receiving, prior to transmitting the message, a request from the user equipment for configuring the logical channel or a sidelink bearer associated with the sidelink transmission. In some embodiments, the method includes receiving, by the communication node, a second message from the user equipment prior to transmitting the message. The second message includes a second set of information for configuring the logical channel for the sidelink transmission.

In another example aspect, a method for wireless communication includes receiving, by a user equipment, a message from a communication node. The message includes information about a logical channel group, a Quality of Service (QOS) parameter, or a QoS Flow Identity (QFI) parameter. The method includes performing, by the user equipment, a sidelink transmission based on the information.

In some embodiments, the information indicates at least one of: a mapping between an identifier of a logical channel group and QoS information, a mapping between the identifier of the logical channel group and a scheduling request identity, a mapping between the identifier of the logical channel group and a configured grant resource, a mapping between the identifier of the logical channel group and a transmission mode, a mapping between the QoS parameter and a scheduling request identity, a mapping between the QoS parameter and a configured grant resource, a mapping between the QoS parameter and a transmission mode, a mapping between the QFI parameter and a scheduling request identity, a mapping between the QFI parameter and a configured grant resource, or a mapping between the QFI parameter and a transmission mode.

In some embodiments, the information indicates, for each logical channel group, a list or a range of associated QoS information, a list or a range of associated QFI information, a list of scheduling request identities, a list of allowed configured grant resources, or a list of transmission modes. In some embodiments, the information indicates, for each scheduling request identity, a list of QoS identities or a list of QFI parameters. In some embodiments, the information indicates, for each configured grant type index, a list of QoS identities or a list of QFI parameters.

In some embodiments, the information about the logical channel group includes at least one of: associated QoS information, associated QFI information, one or more scheduling request identities, one or more configured grant resources, or one or more transmission modes.

In some embodiments, the information about the QoS parameter includes at least one of: associated QFI information, one or more scheduling request identities, one or more configured grant resources, or one or more transmission modes.

In some embodiments, the information about the QFI parameter includes at least one of: associated QoS information, one or more scheduling request identities, one or more configured grant resources, or one or more transmission modes.

In some embodiments, the transmission mode indicates whether the communication node schedules a transmission resource for the sidelink transmission or the user equipment selects the transmission resource from a pool of resources configured by the communication node. The method further includes determining, by the user equipment, an amount of sidelink data available for a logical channel. The logical channel is configured with a transmission mode that indicates the communication node schedules the transmission resource, or the logical channel belongs to a logical channel group configured with a transmission mode that indicates the communication node schedules the transmission resource.

In another example aspect, a method for wireless communication includes transmitting, by a communication node, a message to a user equipment for performing a sidelink transmission. The message includes information about a logical channel group, a Quality of Service (QOS) parameter, or a QoS Flow Identity (QFI) parameter.

In some embodiments, the information indicates at least one of: a mapping between an identifier of a logical channel group and QoS information, a mapping between the identifier of the logical channel group and a scheduling request identity, a mapping between the identifier of the logical channel group and a configured grant resource, a mapping between the identifier of the logical channel group and a transmission mode, a mapping between the QoS parameter and a scheduling request identity, a mapping between the QoS parameter and a configured grant resource, a mapping between the QoS parameter and a transmission mode, a mapping between the QFI parameter and a scheduling request identity, a mapping between the QFI parameter and a configured grant resource, or a mapping between the QFI parameter and a transmission mode.

In some embodiments, the information indicates, for each logical channel group, a list or a range of associated QoS information, a list or a range of associated QFI information, a list of scheduling request identities, a list of allowed configured grant resources, or a list of transmission modes. In some embodiments, the information indicates, for each scheduling request identity, a list of QoS identities or a list of QFI parameters. In some embodiments, the information indicates, for each configured grant type index, a list of QoS identities or a list of QFI parameters.

In some embodiments, the information about the logical channel group includes at least one of: associated QoS information, associated QFI information, one or more scheduling request identities, one or more configured grant resources, or one or more transmission modes.

In some embodiments, the information about the QoS parameter includes at least one of: associated QFI information, one or more scheduling request identities, one or more configured grant resources, or one or more transmission modes.

In some embodiments, the information about the QFI parameter includes at least one of: associated QoS information, one or more scheduling request identities, one or more configured grant resources, or one or more transmission modes.

In some embodiments, the transmission mode indicates whether the communication node schedules a transmission resource for the sidelink transmission or the user equipment selects the transmission resource from a pool of resources configured by the communication node. The method further includes determining, by the user equipment, an amount of sidelink data available for a logical channel. The logical channel is configured with a transmission mode that indicates the communication node schedules the transmission resource, or the logical channel belongs to a logical channel group configured with a transmission mode that indicates the communication node schedules the transmission resource.

In another example aspect, a method for wireless communication includes receiving, by a user equipment, a message from a communication node for configuring a sidelink transmission or an uplink transmission without a dynamic grant. The message includes information about a configured grant. The method also includes performing, by the user equipment, the sidelink transmission or the uplink transmission based on the information. The information indicates at least one or more QoS parameters for the configured grant, one or more QoS Flow Identity (QFI) parameters for the configured grant, one or more logical channel groups or one or more logical channels associated with the configured grant, a preemption configuration for the configured grant, an indicator indicating whether sharing is allowed, or an indicator indicating whether preemption is allowed.

In some embodiments, the information includes an index of the configured grant. In some embodiments, the one or more QoS parameters includes at least one of a 5G QoS Identifier (5QI), a ProSe Per-Packet Priority (PPPP), a ProSe Per-Packet Reliability (PPPR), a resource type, a priority level, a Packet Delay Budget (PDB), a Packet Error Rate, an averaging window, or a transmission range level. In some embodiments, the preemption configuration includes at least one of: an indicator to indicate whether a resource is to be preempted, a temporary identity for indicating preemption in the sidelink or the uplink transmission, or information about a resource that is to be preempted.

In some embodiments, the method includes transmitting, by the user equipment, information about a resource request, assistance information about the user equipment, or sidelink information about the user equipment to the communication node.

In another example aspect, a method for wireless communication includes transmitting, by a communication node, a message to a user equipment for configuring a sidelink transmission or an uplink transmission without a dynamic grant. The message includes information about a configured grant. The information indicates at least one or more QoS parameters for the configured grant, one or more QoS Flow Identity (QFI) parameters for the configured grant, one or more logical channel groups or one or more logical channels associated with the configured grant, a preemption configuration for the configured grant, an indicator indicating whether sharing is allowed, or an indicator indicating whether preemption is allowed.

In some embodiments, the information includes an index of the configured grant. In some embodiments, the one or more QoS parameters includes at least one of a 5G QoS Identifier (5QI), a ProSe Per-Packet Priority (PPPP), a ProSe Per-Packet Reliability (PPPR), a resource type, a priority level, a Packet Delay Budget (PDB), a Packet Error Rate, an averaging window, or a transmission range level. In some embodiments, the preemption configuration includes an indicator to indicate whether a resource is to be preempted and a temporary identity for indicating preemption in the sidelink or the uplink transmission.

In some embodiments, the method includes transmitting, by the user equipment, information about a resource request, assistance information about the user equipment, or sidelink information about the user equipment to the communication node.

In another example aspect, a wireless communication apparatus includes a processor configured to implement the methods described above.

In yet another example aspect, a computer program product has code stored thereon. The code, when executed by a processor, causes the processor to implement the methods described above.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:
   receiving, by a user equipment, a message from a communication node, wherein the message includes an SL-LogicalChannelConfig information element specifying information for configuring a sidelink logical channel for a sidelink transmission, wherein the information includes a scheduling request identity associated with the sidelink logical channel and one or more allowed configured grants associated with the sidelink logical channel, and wherein a presence of the scheduling request identity indicates that a corresponding scheduling request configuration is applicable to the sidelink logical channel;
   configuring, by the user equipment, a Medium Access Control (MAC) entity of the sidelink logical channel according to the information; and
   performing the sidelink transmission using the sidelink logical channel based on the configuring.

2. The method of claim 1, wherein the information includes a priority associated with the sidelink logical channel.

3. The method of claim 1, wherein the information indicates a logical channel group to which the sidelink logical channel belongs to.

4. The method of claim 1, wherein the information indicates an allowed configured grant type.

5. The method of claim 1, wherein the information includes one or more parameters related to Quality of Service (QOS) information associated with the sidelink logical channel.

6. A method for wireless communication, comprising:
   transmitting, by a communication node, a message to a user equipment,
   wherein the message includes an SL-LogicalChannelConfig information element specifying information that enables the user equipment to configure a MAC entity of a sidelink logical channel for a sidelink transmission,
   wherein the information includes a scheduling request identity associated with the sidelink logical channel and one or more allowed configured grants associated with the sidelink logical channel, and wherein a presence of the scheduling request identity indicates that a corresponding scheduling request configuration is applicable to the sidelink logical channel.

7. The method of claim 6, wherein the information includes a priority associated with the sidelink logical channel.

8. The method of claim 6, wherein the information indicates a logical channel group to which the sidelink logical channel belongs to.

9. The method of claim 6, wherein the information includes an allowed configured grant type.

10. The method of claim 6, wherein the information includes one or more parameters related to Quality of Service (QOS) information associated with the sidelink logical channel.

11. A wireless communication apparatus, comprising a processor configured to:
receive a message from a communication node, wherein the message includes an SL-LogicalChannelConfig information element specifying information for configuring a sidelink logical channel for a sidelink transmission, wherein the information includes a scheduling request identity associated with the sidelink logical channel and one or more allowed configured grants associated with the sidelink logical channel, and wherein a presence of the scheduling request identity indicates that a corresponding scheduling request configuration is applicable to the sidelink logical channel;
configure a Medium Access Control (MAC) entity of the sidelink logical channel according to the information; and
perform the sidelink transmission using the sidelink logical channel based on the configuring.

12. The apparatus of claim 11, wherein the information includes a priority associated with the sidelink logical channel.

13. The apparatus of claim 11, wherein the information indicates a logical channel group to which the sidelink logical channel belongs to.

14. The apparatus of claim 11, wherein the information includes an allowed configured grant type.

15. The apparatus of claim 11, wherein the information includes one or more parameters related to Quality of Service (QOS) associated with the sidelink logical channel.

16. A wireless communication apparatus, comprising a processor configured to:
transmit a message to a user equipment,
wherein the message includes an SL-LogicalChannelConfig information element specifying information that enables a user equipment to configure a MAC entity of a sidelink logical channel for a sidelink transmission,
wherein the information includes a scheduling request identity associated with the sidelink logical channel and one or more allowed configured grants associated with the sidelink logical channel, and wherein a presence of the scheduling request identity indicates that a corresponding scheduling request configuration is applicable to the sidelink logical channel.

17. The apparatus of claim 16, wherein the information includes a priority associated with the sidelink logical channel.

18. The apparatus of claim 16, wherein the information indicates a logical channel group to which the sidelink logical channel belongs to.

19. The apparatus of claim 16, wherein the information includes an allowed configured grant type.

20. The apparatus of claim 16, wherein the information includes one or more parameters related to Quality of Service (QOS) information associated with the sidelink logical channel.

* * * * *